(12) United States Patent
Seiki et al.

(10) Patent No.: US 9,895,648 B2
(45) Date of Patent: Feb. 20, 2018

(54) $CO_2$ RECOVERY SYSTEM

(71) Applicant: MITSUBISHI HEAVY INDUSTRIES, LTD., Tokyo (JP)

(72) Inventors: Yoshio Seiki, Tokyo (JP); Kouji Horizoe, Tokyo (JP); Atsuhiro Yukumoto, Tokyo (JP); Haruaki Hirayama, Tokyo (JP); Masaki Yushima, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 119 days.

(21) Appl. No.: 14/410,418

(22) PCT Filed: Jul. 11, 2013

(86) PCT No.: PCT/JP2013/069028
§ 371 (c)(1),
(2) Date: Dec. 22, 2014

(87) PCT Pub. No.: WO2014/013939
PCT Pub. Date: Jan. 23, 2014

(65) Prior Publication Data
US 2015/0321136 A1 Nov. 12, 2015

(30) Foreign Application Priority Data
Jul. 20, 2012 (JP) ................... 2012-161238

(51) Int. Cl.
*B01D 53/14* (2006.01)
*B01D 53/18* (2006.01)
(Continued)

(52) U.S. Cl.
CPC ..... *B01D 53/1418* (2013.01); *B01D 53/1425* (2013.01); *B01D 53/1475* (2013.01);
(Continued)

(58) Field of Classification Search
CPC combination set(s) only.
See application file for complete search history.

(56) References Cited

U.S. PATENT DOCUMENTS

| 5,736,115 A | * | 4/1998 | Iijima | ................ | B01D 53/1493 |
| | | | | | 423/228 |
| 6,929,680 B2 | * | 8/2005 | Krushnevych | ..... | B01D 53/1475 |
| | | | | | 423/232 |

(Continued)

FOREIGN PATENT DOCUMENTS

| JP | 63-151330 A | 6/1988 |
| JP | 8-80421 A | 3/1996 |

(Continued)

OTHER PUBLICATIONS

International Search Report dated Oct. 15, 2013 issued in corresponding application No. PCT/JP2013/069028.
(Continued)

*Primary Examiner* — Cabrena Holecek
(74) *Attorney, Agent, or Firm* — Westerman, Hattori, Daniels & Adrian, LLP

(57) ABSTRACT

A $CO_2$ recovery system includes an absorption tower that brings gas containing $CO_2$ into contact with a $CO_2$ absorption solution to remove $CO_2$ from the $CO_2$-containing gas; a regeneration tower that regenerates a $CO_2$-absorbed rich solution; and a compression device that re-uses a lean solution, from which $CO_2$ has been removed in the regeneration tower, in the absorption tower and compresses $CO_2$ in gas emitted from the regeneration tower, wherein the rich solution has a high pressure, the high-pressure rich solution is subjected to gas-liquid separation by a flash drum, the rich solution as a liquid component separated in the flash drum is introduced into the regeneration tower, and high-pressure $CO_2$ gas as a gas component separated in the flash drum is
(Continued)

introduced into a compression device having a predetermined compression pressure.

7 Claims, 9 Drawing Sheets

(51) Int. Cl.
*C01B 31/20* (2006.01)
*B01D 53/62* (2006.01)
*C01B 32/50* (2017.01)

(52) U.S. Cl.
CPC .............. *B01D 53/62* (2013.01); *C01B 32/50* (2017.08); *B01D 2258/0283* (2013.01); *Y02C 10/04* (2013.01); *Y02C 10/06* (2013.01); *Y02P 20/152* (2015.11)

(56) References Cited

U.S. PATENT DOCUMENTS

| | | | |
|---|---|---|---|
| 8,845,788 B2* | 9/2014 | Mak | C10K 1/08 95/173 |
| 2006/0150812 A1* | 7/2006 | Mak | B01D 53/1406 95/199 |
| 2007/0028774 A1* | 2/2007 | Rochelle | B01D 53/1425 95/236 |
| 2007/0077188 A1* | 4/2007 | Katz | B01D 53/1425 423/220 |
| 2011/0203314 A1* | 8/2011 | Mak | B01D 53/1425 62/617 |

FOREIGN PATENT DOCUMENTS

| | | |
|---|---|---|
| JP | 9-150029 A | 6/1997 |
| JP | 2002-126439 A | 5/2002 |
| JP | 2007-533431 A | 11/2007 |
| WO | 2010/136425 A1 | 12/2010 |
| WO | WO 2011102830 A1 * 8/2011 ......... B01D 53/1425 |

OTHER PUBLICATIONS

Written Opinion of the International Searching Report dated Oct. 15, 2013 issued in corresponding application No. PCT/JP2013/069028.

Translation of Written Opinion of the International Searching Authority dated Oct. 15, 2013 issued in corresponding Application No. PCT/JP2013/069028. (6 pages).

Decision of a Patent Grant dated Jun. 14, 2016, issued in counterpart Japanese Patent Application No. 2012-161238, with English translation. (3 pages).

* cited by examiner

CO₂ RECOVERY SYSTEM

TECHNICAL FIELD

The present invention relates to a $CO_2$ recovery system that absorbs $CO_2$ from gas and reduces $CO_2$ compression power.

BACKGROUND ART

As one of the causes of global warming, the greenhouse effect by $CO_2$ has been identified, and a countermeasure thereof is urgently required internationally from the viewpoint of protecting the global environment. Sources of $CO_2$ emission spread over various fields of human activity where fossil fuel is burned, and demand on emission reduction of $CO_2$ tends to increase. As a result, for power generation facilities such as a thermal power plant where a large amount of fossil fuel is used, a $CO_2$ recovery method has been actively studied in which flue gas of a boiler is brought into contact with an amine-based absorption solution such as an aqueous amine compound solution so as to remove and recover $CO_2$ from the flue gas.

In the related art, PTL 1 discloses an amine recovery process in which an amine compound accompanying decarbonated flue gas, from which $CO_2$ has been absorbed and removed by gas-liquid contact with an absorption solution, is sequentially recovered in plural stages of water-washing sections that are provided for bringing the decarbonated flue gas into gas-liquid contact with a washing solution to recover the amine compound.

In addition, in the related art, PTL 2 discloses a configuration including: a cooling unit that cools decarbonated flue gas from which $CO_2$ has been absorbed and removed by gas-liquid contact with an absorption solution; and a contact unit that brings condensate, which has been condensed in the cooling unit, into counterflow contact with the decarbonated flue gas. Further, PTL 2 discloses a configuration including a water-washing section in which an amine compound accompanying decarbonated flue gas is recovered. In this configuration, condensate, which has been condensed in a cooling tower in which flue gas is cooled before $CO_2$ is recovered therefrom, is used as washing water.

CITATION LIST

Patent Literature

[PTL 1] Japanese Unexamined Patent Application Publication No. 2002-126439
[PTL 2] Japanese Unexamined Patent Application Publication No. 8-80421

SUMMARY OF INVENTION

Technical Problem

However, recently, from the viewpoint of protecting the environment, when a $CO_2$ recovery device is installed to process flue gas in, for example, a thermal power plant where the flow rate of gas to be processed is high, the amount of $CO_2$ to be removed is large. Therefore, for example, when the $CO_2$ recovery device is buried in the ground, it is desired to reduce power relating to $CO_2$ compression in a $CO_2$ recovery plant.

The present invention has been made in order to solve the above-described problems, and an object thereof is to provide a $CO_2$ recovery system that absorbs $CO_2$ from gas and reduces $CO_2$ compression power.

Solution to Problem

According to a first aspect of the present invention for solving the above-described problems, there is provided a $CO_2$ recovery system comprising: an absorption tower that brings gas containing $CO_2$ into contact with a $CO_2$ absorption solution to remove $CO_2$ from the $CO_2$-containing gas; a regeneration tower that regenerates a $CO_2$-absorbed rich solution; and a compression device that re-uses a lean solution, from which $CO_2$ has been removed in the regeneration tower, in the absorption tower and compresses $CO_2$ in gas emitted from the regeneration tower, wherein the rich solution has a high pressure, the high-pressure rich solution is subjected to gas-liquid separation by a flash drum, the rich solution as a liquid component separated in the flash drum is introduced into the regeneration tower, and high-pressure $CO_2$ gas as a gas component separated in the flash drum is introduced into a compression device having a predetermined compression pressure.

According to a second aspect of the present invention, in the $CO_2$ recovery system according to the first aspect, plural stages of flash drums may be provided, a pressure-reducing valve may be provided on an upstream side of a gas-liquid separator, and $CO_2$ gas as a gas component separated in each of the flash drums may be introduced into a compression device having a predetermined compression pressure corresponding to a pressure of the $CO_2$ gas as the gas component.

According to a third aspect of the present invention, in the $CO_2$ recovery system according to the second aspect, a heat exchanger which heats the rich solution is provided between the absorption tower and an initial gas-liquid separator.

According to a fourth aspect of the present invention, in the $CO_2$ recovery system according to the second aspect, an inert gas separator, which separates inert gas, and an inert gas introduction line, which introduces the separated inert gas into the absorption tower, may be provided between the absorption tower and an initial gas-liquid separator.

According to a fifth aspect of the present invention, in the $CO_2$ recovery system according to the first aspect, when the gas introduced into the absorption tower is normal-pressure gas, a normal-pressure absorption tower may be used, a booster pump that pressurizes the rich solution emitted from the normal-pressure absorption tower may be provided, and the pressurized rich solution may be subjected to gas-liquid separation by the gas-liquid separator.

According to a sixth aspect of the present invention, in the $CO_2$ recovery system according to the first aspect, when the gas introduced into the absorption tower is high-pressure gas, a pressurization absorption tower may be used, and the pressurized rich solution emitted from the pressurization absorption tower may be subjected to gas-liquid separation by the gas-liquid separator.

Advantageous Effects of Invention

According to the present invention, the flash drum is provided. Therefore, by the pressure being released by the flash operation of the flash drum, a portion of $CO_2$ absorbed in the pressurized rich solution is released and emitted as high-pressure $CO_2$ gas. This emitted high-pressure $CO_2$ gas is introduced into the compressor of the $CO_2$ compression device that is provided on a gas flow downstream side of the regeneration tower to compress $CO_2$. As a result, compression power for compressing $CO_2$ gas, which is emitted from

DESCRIPTION OF EMBODIMENTS

Hereinafter, the present invention will be described with reference to the drawings. The present invention is not limited to the embodiment. In addition, in the case of plural embodiments, combinations of the respective embodiments are included in the present invention. In addition, components in the following embodiment include components which can be easily conceived by those skilled in the art, and substantially identical ones thereto.

Embodiment 1

A $CO_2$ recovery system according to Embodiment 1 of the present invention will be described with reference to the drawings.

Figure 1:
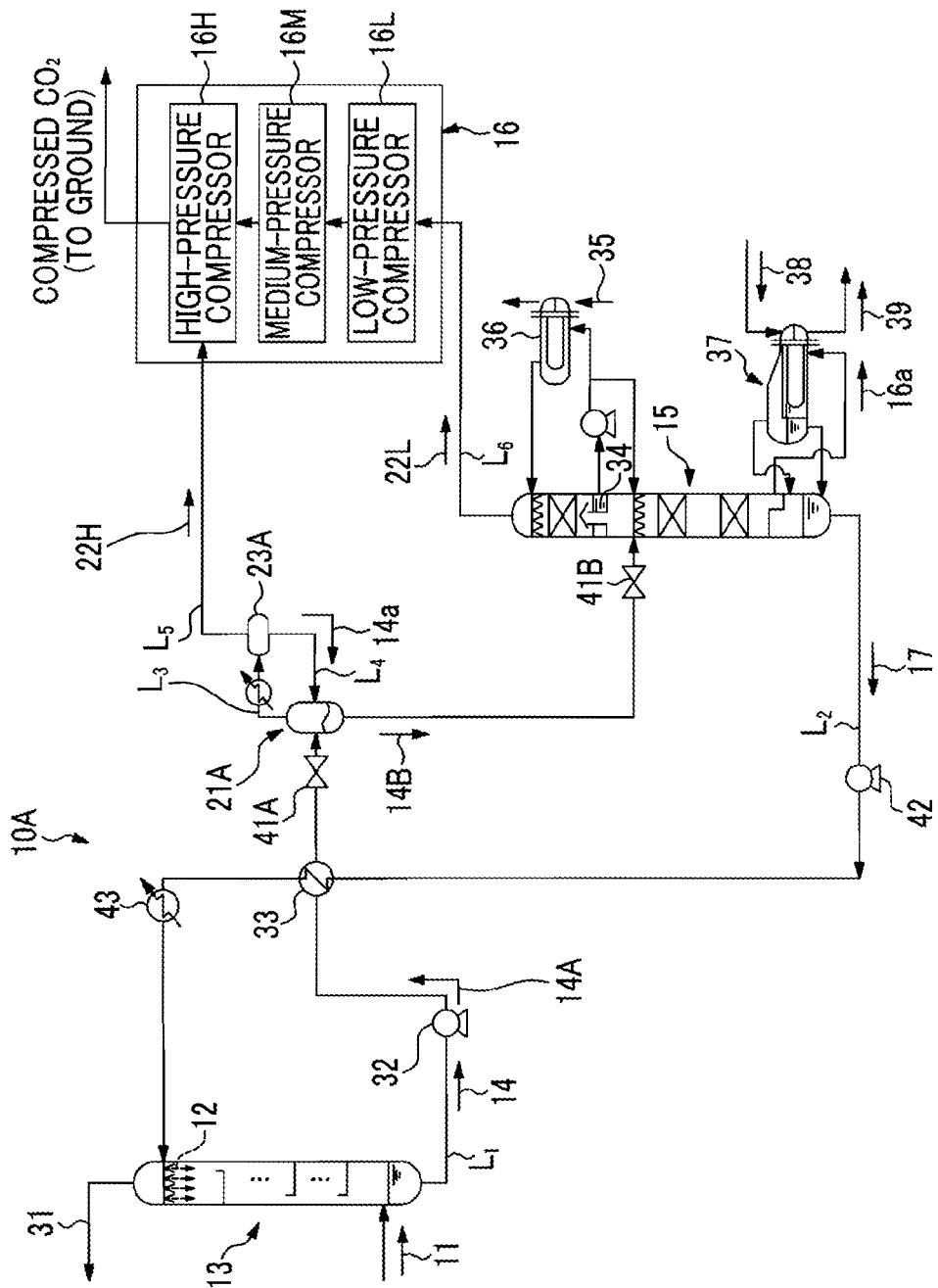
FIG. 1 is a schematic diagram illustrating a $CO_2$ recovery system according to Embodiment 1.
Figure 2:
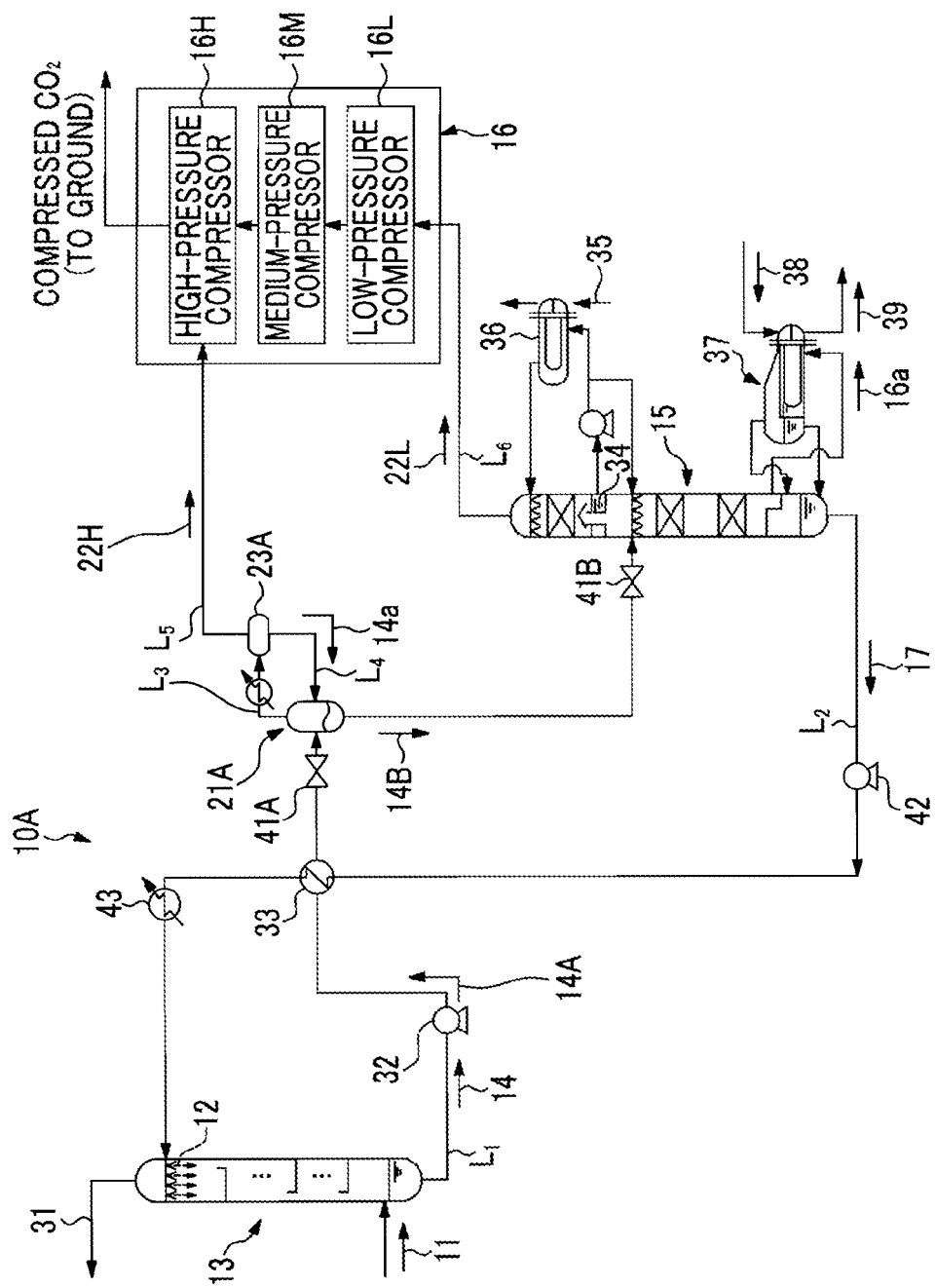
FIG. 2 is a schematic diagram illustrating the $CO_2$ recovery system according to Embodiment 1.

FIGS. 1 and 2 are schematic diagrams illustrating the $CO_2$ recovery system according to Embodiment 1. As illustrated in FIG. 1, a $CO_2$ recovery system 10A according to the embodiment includes: a normal-pressure absorption tower 13 that brings normal-pressure flue gas (referred to as "gas (normal-pressure)") 11 containing $CO_2$ into contact with a $CO_2$ absorption solution 12 to remove $CO_2$ from the normal-pressure flue gas; a normal-pressure regeneration tower 15 that regenerates a $CO_2$-absorbed rich solution 14; and a $CO_2$ compression device 16 including a high-pressure compressor 16H and a low-pressure compressor 16L that re-uses a lean solution 17, from which $CO_2$ has been removed in the normal-pressure regeneration tower 15, in the absorption tower 13 and gradually compresses $CO_2$ in gas, which has been emitted from the normal-pressure regeneration tower 15, at a plurality of predetermined pressures. In the $CO_2$ recovery system 10A, the rich solution 14 is pressurized by a booster pump 32 to obtain a pressurized rich solution 14A, a first flash drum 21A that separates carbon dioxide gas ($CO_2$) from the pressurized rich solution 14A through a flash operation is provided, the rich solution 14B which has been partially regenerated as a liquid component separated in the first flash drum 21A is introduced into the regeneration tower 15, and a high-pressure $CO_2$ gas 22H as a gas component separated in the first flash drum 21A is introduced into a high-pressure compressor 16H having a predetermined pressure.

In the absorption tower 13, the gas (normal-pressure) 11 containing carbon dioxide ($CO_2$) emitted from, for example, a boiler is brought into counterflow contact with the $CO_2$ absorption solution (amine solution) 12 containing, for example, alkanolamine as a base such that the $CO_2$ absorption solution 12 absorbs $CO_2$ from the gas 11 and removes $CO_2$ from the gas 11. The rich solution 14 which is the $CO_2$-absorbed $CO_2$ absorption solution emits $CO_2$ in the regeneration tower 15. When $CO_2$ reaches the bottom of the regeneration tower 15, most of the $CO_2$ is removed, and the absorption solution is regenerated as the lean solution 17. This regenerated lean solution 17 is supplied again to the absorption tower 13 to be used as the $CO_2$ absorption solution 12.

Here, in FIG. 1, reference numeral $L_1$ represents a first liquid feed line that feeds the rich solution from the absorption tower 13 to the regeneration tower 15, reference numeral $L_2$ represents a second liquid feed line that feeds the lean solution 17 from the regeneration tower 15 to the absorption tower 13, reference numeral $L_3$ represents a gas feed line that feeds the high-pressure $CO_2$ gas 22H from the first flash drum 21A to a first gas-liquid separator 23A, reference numeral $L_4$ represents a liquid return line that returns an absorption solution 14a recovered from the first gas-liquid separator 23A to the first flash drum 21A, reference numeral $L_5$ represents a gas feed line that feeds the high-pressure $CO_2$ gas 22H from the first gas-liquid separator 23A to the high-pressure compressor 16H, reference numeral $L_6$ represents a gas feed line that feeds the low-pressure $CO_2$ gas 22L from the top portion of the regeneration tower 15 to the low-pressure compressor 16L, reference numeral 31 represents purified gas from which $CO_2$ has been removed, reference numeral 32 represents the booster pump for the rich solution 14 that is provided in the first liquid feed line $L_1$, reference numeral 33 represents a heat exchanger that exchanges heat between the pressurized rich solution 14A and the lean solution 17, reference numeral 36 represents a cooling condenser that cools steam condensate 34 on the top portion of the regeneration tower with cooling water 35, reference numeral 37 represents a reboiler that reheats a portion 16a of the lean solution 17, reference numeral 38 represents saturated steam that is supplied to the reboiler 37, reference numeral 39 represents the steam condensate, reference numerals 41A and 41B represent a pressure-reducing valves that are provided in the first liquid feed line $L_1$, reference numeral 42 represents a liquid feed pump that feeds the lean solution 17 from the regeneration tower 15 to the absorption tower 13, and reference numeral 43 represents cooling means for cooling the lean solution 17.

The normal-pressure gas 11 is introduced into the absorption tower 13, the $CO_2$ absorption solution 12 absorbs $CO_2$ contained in the gas to obtain the rich solution 14, and the rich solution 14 is emitted from the bottom portion of the absorption tower. Next, the pressurized rich solution 14A that is pressurized by the booster pump 32 is controlled to a predetermined pressure by the pressure-reducing valve 41A and is introduced into the first flash drum 21A.

Here, it is necessary that the pressure of the pressurized rich solution 14A pressurized in the booster pump 32 be higher than a compression pressure of the high-pressure compressor 16H of the $CO_2$ compression device 16. For example, when the compression pressure of the high-pressure compressor 16H is 630 kPaG, the pressure of the pressurized rich solution 14A is about 800 kPaG (a pressure higher than a predetermined pressure of the compressor by about 50 kPaG to 200 kPaG).

The pressure-reducing valve 41A that is provided on an upstream side of the first flash drum 21A is controlled such that the partially regenerated rich solution 14B has a temperature of about 102° C. and a pressure of about 655 kPaG.

In the first flash drum 21A, the pressurized rich solution 14A is flashed at a predetermined pressure, a portion of carbon dioxide ($CO_2$) in the pressurized rich solution 14A is released, and the pressurized rich solution 14A is partially regenerated.

In the first flash drum 21A, the pressurized rich solution 14A is separated into the high-pressure $CO_2$ gas 22H and the partially generated rich absorption solution 14B.

The separated high-pressure $CO_2$ gas 22H having a desired pressure (for example, 630 kPaG) is fed to the first gas-liquid separator 23A through the gas feed line $L_3$. In this gas-liquid separator 23A, the absorption solution 14a accompanying the gas during flashing is separated and is fed to the high-pressure compressor 16H through the gas feed line $L_5$. The separated absorption solution 14a is returned to the first flash drum 21A.

The pressure-reducing valves 41A and 41B decrease a pressure to predetermined pressures, respectively, are provided in the first liquid feed line $L_1$, and are provided on an upstream side of the first flash drum 21A and the regeneration tower 15 to control the pressures of the rich solutions 14A and 14B to predetermined pressures.

FIG. 2 is a schematic diagram illustrating the $CO_2$ recovery system to describe a temperature and a pressure of flashed gas according to an example of the embodiment.

The pressurized rich solution 14A is controlled to have a predetermined pressure (655 kPaG, 102° C.) by the pressure-reducing valve 41A, is introduced into the first flash drum 21A, and is partially regenerated to obtain the partially regenerated rich solution 14B by a portion of $CO_2$ being released. This partially regenerated rich solution 14B is fed to the regeneration tower 15.

The high-pressure $CO_2$ gas 22H containing 17% of the total amount of $CO_2$ which has been released in the first flash drum 21A is fed to the high-pressure compressor 16H at a gas pressure of 630 kPaG and 40° C. through the gas feed line $L_5$.

In addition, the low-pressure $CO_2$ gas 22L containing the rest of the 83% of the total amount of $CO_2$ which has been emitted from the tower top portion of the regeneration tower 15 is fed to the low-pressure compressor 16L at a gas pressure of 50 kPaG and 40° C. through the gas feed line $L_6$.

The lean solution 17 emitted from the bottom portion of the regeneration tower 15 has a temperature of about 120° C. and a pressure of 80 kPaG. Since this temperature is lower than or equal to a deterioration temperature of the amine solution constituting the absorption solution, the absorption solution does not deteriorate.

On the other hand, as in the case of the related art, when the high-pressure rich solution is directly introduced into the high-pressure regeneration tower, the lean solution which has been regenerated by emitting $CO_2$ in the high-pressure regeneration tower is emitted from the bottom portion at about 150° C. or higher and a pressure of 380 kPaG. Therefore, the lean solution 17 is in the high-temperature state, and the amine solution which is the composition of the absorption solution deteriorates.

In this way, according to the embodiment, the first flash drum 21A is provided in the first liquid feed line $L_1$. Therefore, by the pressure being released by the flash operation of the first flash drum, a portion of $CO_2$ absorbed in the pressurized rich solution 14A is released and emitted as the high-pressure $CO_2$ gas 22H. This emitted high-pressure $CO_2$ gas 22H is introduced into the high-pressure compressor 16H of the $CO_2$ compression device 16 that is provided on a gas flow downstream side of the regeneration tower 15 to compress $CO_2$.

As a result, compression power for compressing $CO_2$ gas, which is emitted from the regeneration tower 15, can be significantly saved unlike the related art, and the size of compression facilities can be reduced.

Figure 3:
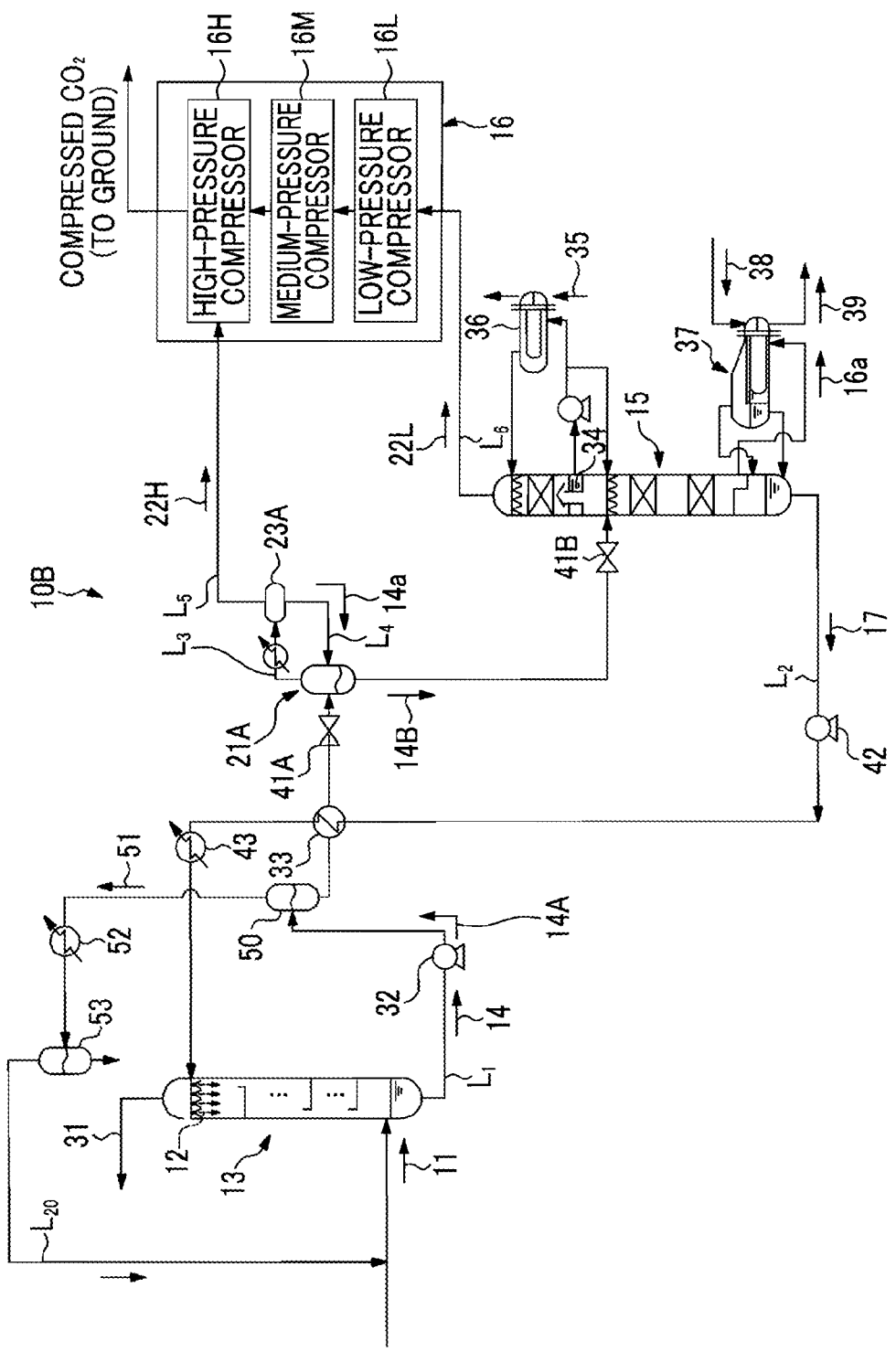
FIG. 3 is a schematic diagram illustrating another $CO_2$ recovery system according to Embodiment 1.

FIG. 3 is a schematic diagram illustrating another $CO_2$ recovery system according to the embodiment.

As illustrated in FIG. 3, a $CO_2$ recovery system 10B according to the embodiment is the same as the $CO_2$ recovery system 10A according to Embodiment 1 illustrated in FIG. 1, except that an inert gas separator 50 is further provided between the booster pump 32 and the heat exchanger 33.

When inert gas is present, the compression purity of $CO_2$ gas cannot be improved because inert gas is non-condensable gas. Accordingly, in the embodiment, inert gas (for example, $N_2$ or $H_2$) 51 present (0.1 wt % or less) in the pressurized rich solution 14A is removed on an upstream side of the first flash drum 21A. The removed inert gas 51 is circulated again to the absorption tower 13 through an inert gas circulating line $L_{20}$. In the inert gas circulating line $L_{20}$, a cooler 52 and a gas-liquid separator 53 are provided.

By providing the inert gas separator 50 to remove the inert gas 51, the purity of compressed and recovered $CO_2$ gas is improved.

In the embodiment, gas-liquid separation is performed using the flash drum, but the invention is not limited thereto. For example, a distillation tower or a separation column may be used for gas-liquid separation.

Embodiment 2

A $CO_2$ recovery system according to Embodiment 2 of the present invention will be described with reference to the drawings.

Figure 4:
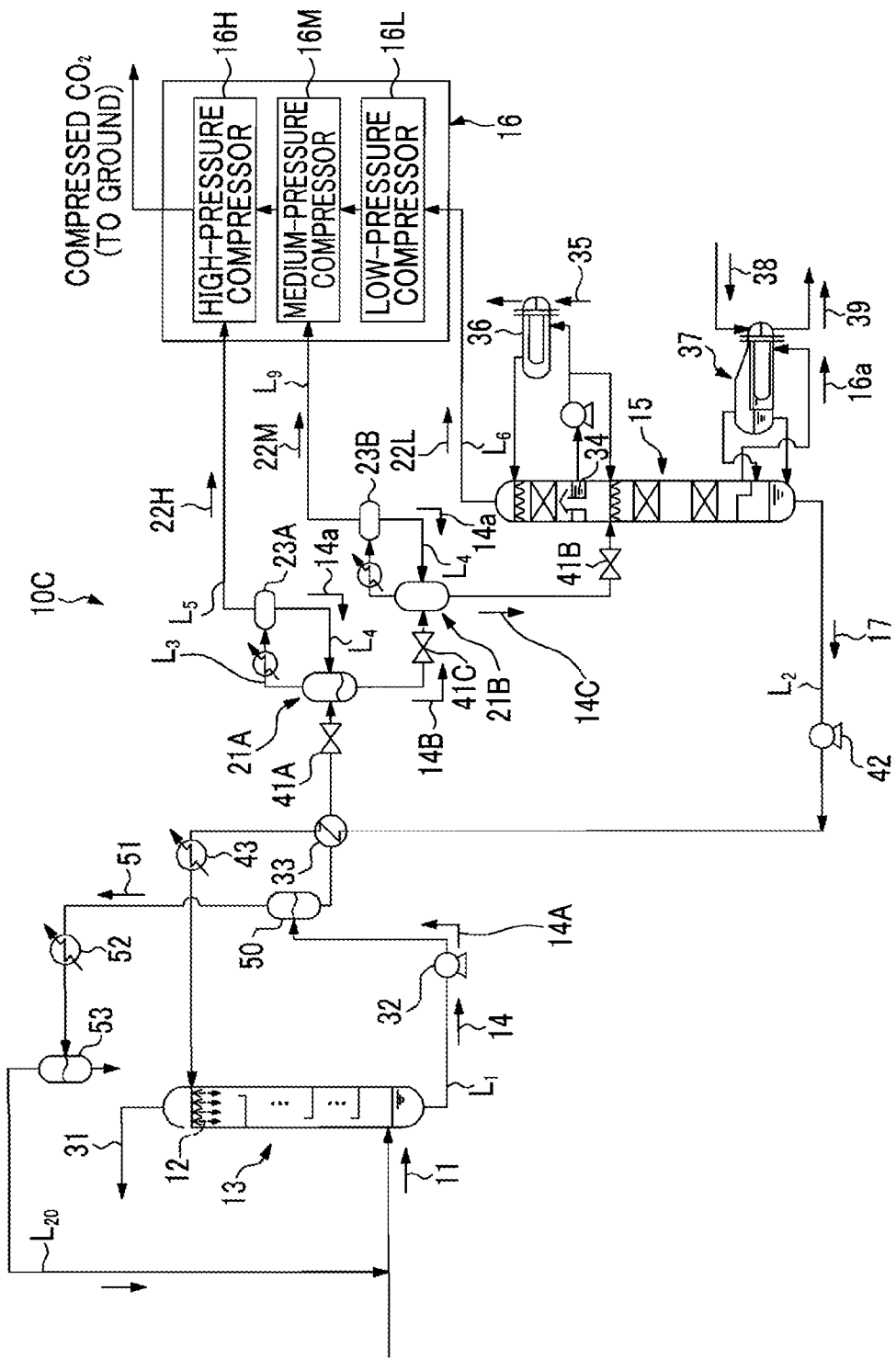
FIG. 4 is a schematic diagram illustrating a $CO_2$ recovery system according to Embodiment 2.
Figure 5:
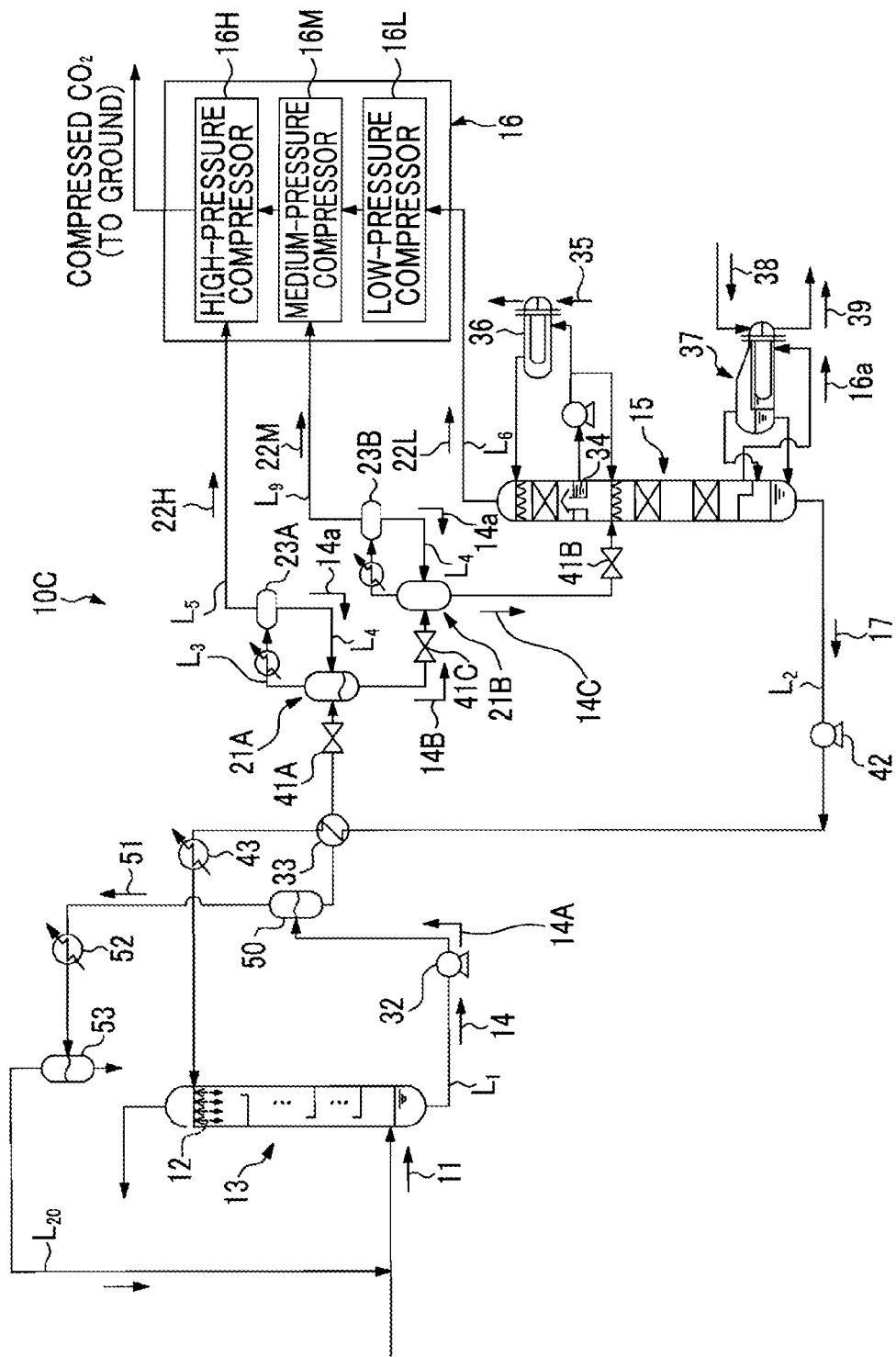
FIG. 5 is a schematic diagram illustrating the $CO_2$ recovery system according to Embodiment 2.

FIGS. 4 and 5 are schematic diagrams illustrating the $CO_2$ recovery system according to Embodiment 2. As illustrated in FIG. 4, a $CO_2$ recovery system 10C according to the embodiment is the same as the $CO_2$ recovery system 10B illustrated in FIG. 3, except that a first flash drum 21A and a second flash drum 21B are provided in the first liquid feed line $L_1$.

In the first flash drum 21A, by the pressure being released by the flash operation, a portion of $CO_2$ absorbed in the pressurized rich solution 14A is released and emitted as the high-pressure $CO_2$ gas 22H. This emitted high-pressure $CO_2$ gas 22H is introduced into the high-pressure compressor 16H of the $CO_2$ compression device 16 that is provided on a gas flow downstream side of the regeneration tower 15 to compress $CO_2$.

In the second flash drum 21B, by the pressure being released by the flash operation, a portion of $CO_2$ absorbed in the partially regenerated rich solution 14B is released and emitted as medium-pressure $CO_2$ gas 22M. This emitted medium-pressure $CO_2$ gas 22M is introduced into a medium-pressure compressor 16M of the $CO_2$ compression device 16 that is provided on a gas flow downstream side of the regeneration tower 15 to compress $CO_2$.

FIG. 5 is a schematic diagram illustrating the $CO_2$ recovery system to describe a temperature and a pressure of gas according to an example of the embodiment.

The pressurized rich solution 14A is controlled to have a predetermined pressure (655 kPaG, 102° C.) by the pressure-reducing valve 41A, is introduced into the first flash drum 21A, and is partially regenerated to obtain the partially regenerated rich solution 14B by a portion of $CO_2$ being released. This partially regenerated rich solution 14B is fed to the regeneration tower 15.

The pressure-reducing valve 41A that is provided on an upstream side of the first flash drum 21A is controlled such that the partially regenerated rich solution 14B has a temperature of about 102° C. and a pressure of about 655 kPaG. The high-pressure $CO_2$ gas 22H containing 17% of the total amount of $CO_2$ which has been released in the first flash drum 21A is fed to the high-pressure compressor 16H at a gas pressure of 630 kPaG and 40° C. through the gas feed line $L_5$.

The pressure-reducing valve 41C that is provided on an upstream side of the second flash drum 21B is controlled such that the partially regenerated rich solution 14C has a temperature of about 95° C. and a pressure of about 255 kPaG.

The medium-pressure $CO_2$ gas 22M containing 19% of the total amount of $CO_2$ which has been released in the second flash drum 21B is fed to the medium-pressure compressor 16M at a gas pressure of 230 kPaG and 40° C. through the gas feed line $L_9$.

In addition, the low-pressure $CO_2$ gas 22L containing the rest of the 64% of the total amount of $CO_2$ which have been emitted from the tower top portion of the regeneration tower 15 is fed to the low-pressure compressor 16L at a gas pressure of 50 kPaG and 40° C. through the gas feed line $L_6$.

The lean solution 17 emitted from the bottom portion of the regeneration tower 15 has a temperature of about 120° C. and a pressure of 80 kPaG. Since this temperature is lower than or equal to a deterioration temperature of the amine solution constituting the absorption solution, the absorption solution does not deteriorate.

In this way, in the embodiment, since the first flash drum 21A and the second flash drum 21B are provided, the high-pressure $CO_2$ gas 22H and the medium-pressure $CO_2$ gas 22M can be extracted. As compared to Embodiment 1, compression power for compressing $CO_2$ gas, which is emitted from the regeneration tower 15, can be significantly saved, and the size of compression facilities can be reduced.
Embodiment 3

A $CO_2$ recovery system according to Embodiment 3 of the present invention will be described with reference to the drawings.

Figure 6:
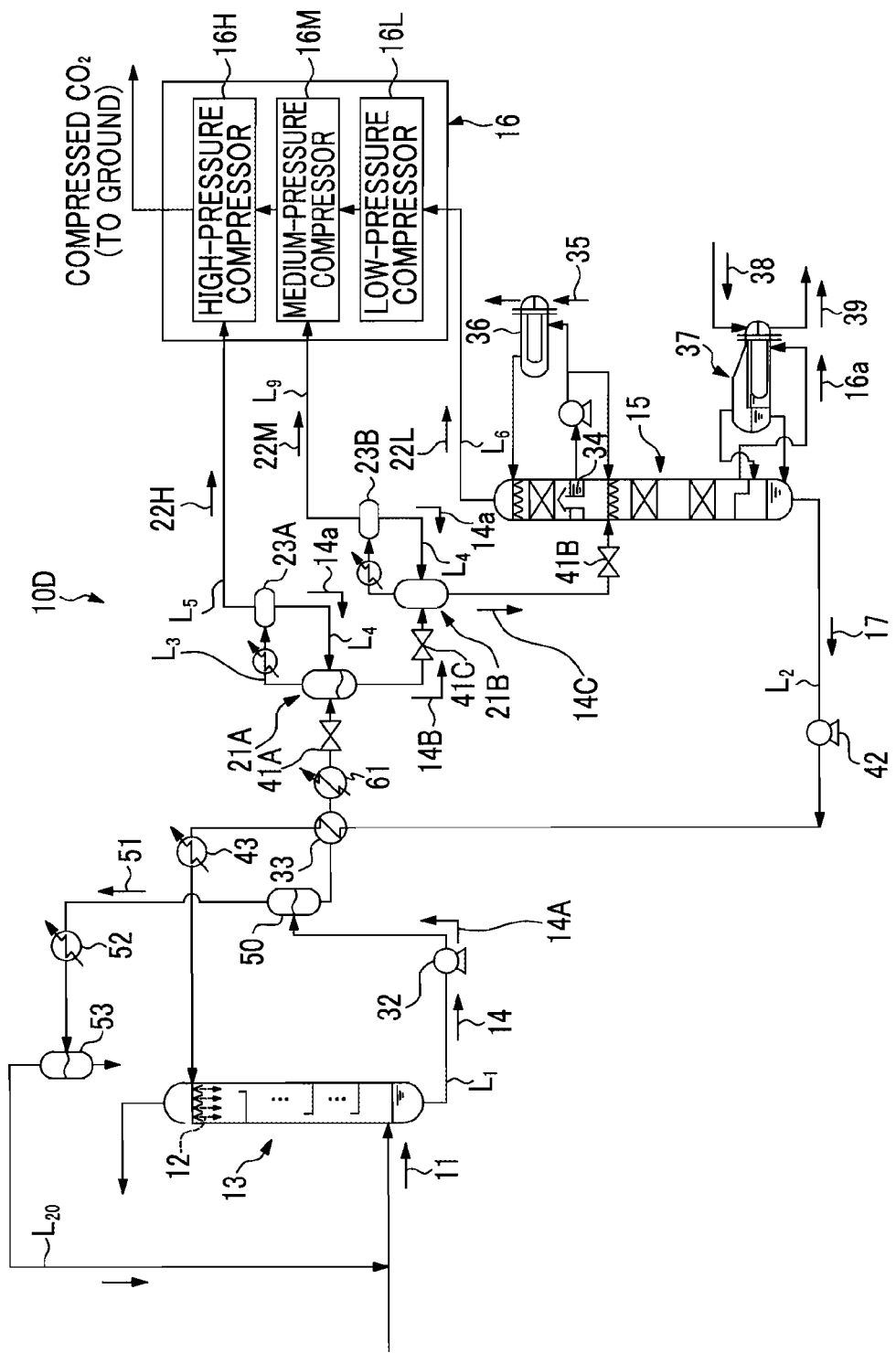
FIG. 6 is a schematic diagram illustrating a $CO_2$ recovery system according to Embodiment 3.
Figure 7:
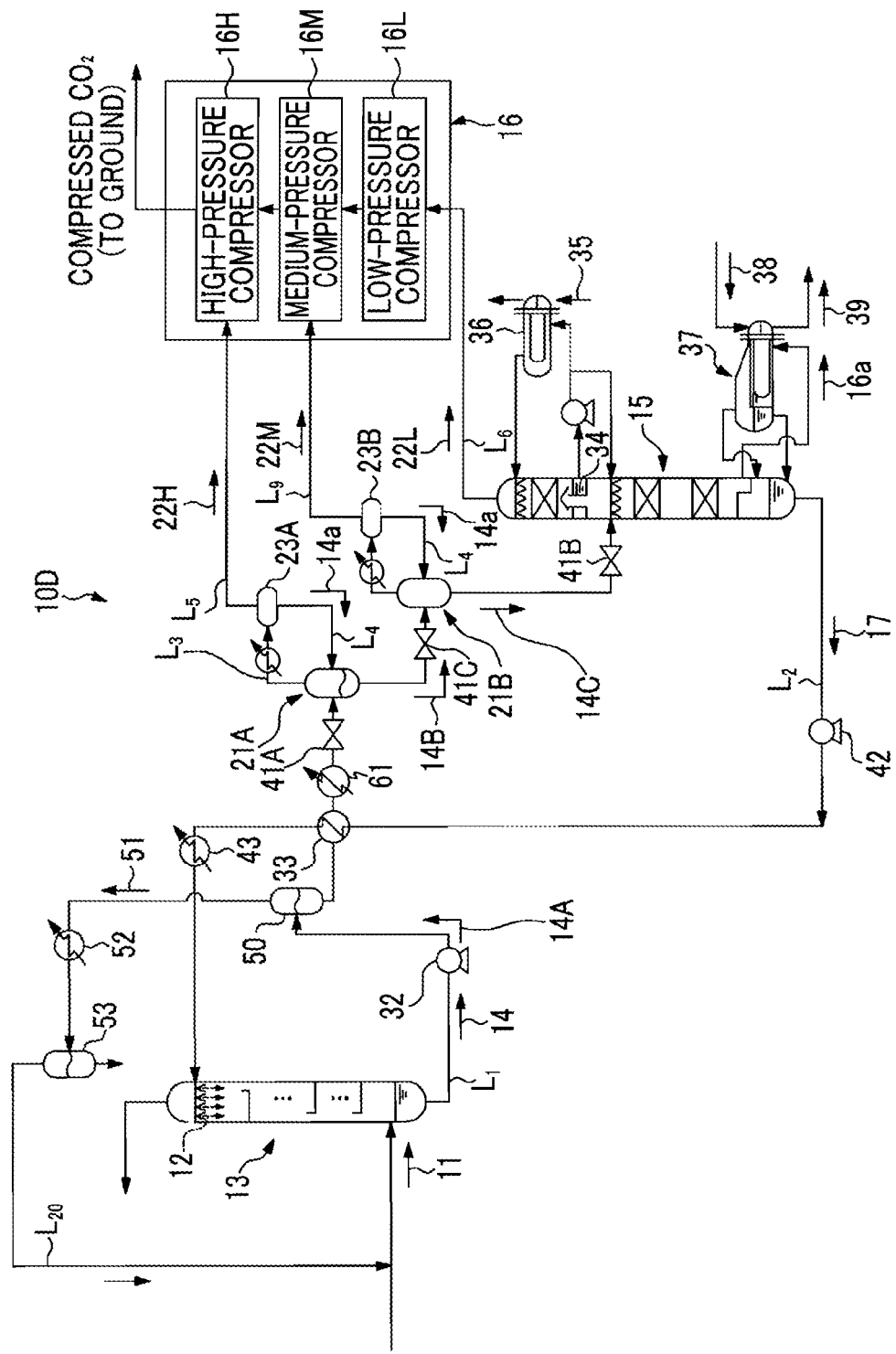
FIG. 7 is a schematic diagram illustrating a $CO_2$ recovery system according to Embodiment 3.

FIGS. 6 and 7 are schematic diagrams illustrating the $CO_2$ recovery system according to Embodiment 3. As illustrated in FIG. 6, a $CO_2$ recovery system 10D according to the embodiment is the same as the $CO_2$ recovery system 10C illustrated in FIG. 4, except that a heat exchanger 61 that heats the pressurized rich solution 14A is provided between the heat exchanger 33 and the pressure-reducing valve 41A which are provided in the first liquid feed line $L_1$.

Due to the provided heat exchanger 61, the pressurized rich solution 14A is heated to around 120° C. which is a heat resistance temperature thereof.

By the heat exchanger 61 heating the pressurized rich solution 14A, the temperature of the pressurized rich solution 14A introduced into the first flash drum 21A increases, and the amount of $CO_2$ gas released in the first flash drum 21A increases.

FIG. 7 is a schematic diagram illustrating the $CO_2$ recovery system to describe a temperature and a pressure of gas according to an example of the embodiment.

Since being heated by the heat exchanger 61, the pressurized rich solution 14A is controlled to have a predetermined pressure (655 kPaG, 120° C.) by the pressure-reducing valve 41A, is introduced into the first flash drum 21A, and is partially regenerated to obtain the partially regenerated rich solution 14B by a portion of $CO_2$ being released. This partially regenerated rich solution 14B is fed to the regeneration tower 15.

The high-pressure $CO_2$ gas 22H containing 37% of the total amount of $CO_2$ which has been released in the first flash drum 21A is fed to the high-pressure compressor 16H at a gas pressure of 630 kPaG and 40° C. through the gas feed line $L_5$.

The medium-pressure $CO_2$ gas 22M containing 28% of the total amount of $CO_2$ which has been released in the second flash drum 21B is fed to the medium-pressure compressor 16M at a gas pressure of 230 kPaG and 40° C. through the gas feed line $L_9$.

In addition, the low-pressure $CO_2$ gas 22L containing the rest of the 35% of the total amount of $CO_2$ which has been emitted from the tower top portion of the regeneration tower 15 is fed to the low-pressure compressor 16L at a gas pressure of 50 kPaG and 40° C. through the gas feed line $L_6$.

The lean solution 17 emitted from the bottom portion of the regeneration tower 15 has a temperature of about 120° C. and a pressure of 80 kPaG. Since this temperature is lower than or equal to a deterioration temperature of the amine solution constituting the absorption solution, the absorption solution does not deteriorate.

In this way, in the embodiment, two stages including the first flash drum 21A and the second flash drum 21B are continuously provided, and the pressurized rich solution 14A is heated by the heat exchanger 61 on an upstream side of the first flash drum 21A. Therefore, the high-pressure $CO_2$ gas 22H and the medium-pressure $CO_2$ gas 22M can be extracted, and the amount of the $CO_2$ gas released from the high-pressure gas increases. As compared to Embodiment 2, compression power for compressing $CO_2$ gas, which is emitted from the regeneration tower 15, can be significantly saved, and the size of compression facilities can be reduced.
Embodiment 4

A $CO_2$ recovery system according to an embodiment of the present invention will be described with reference to the drawings.

Figure 8:
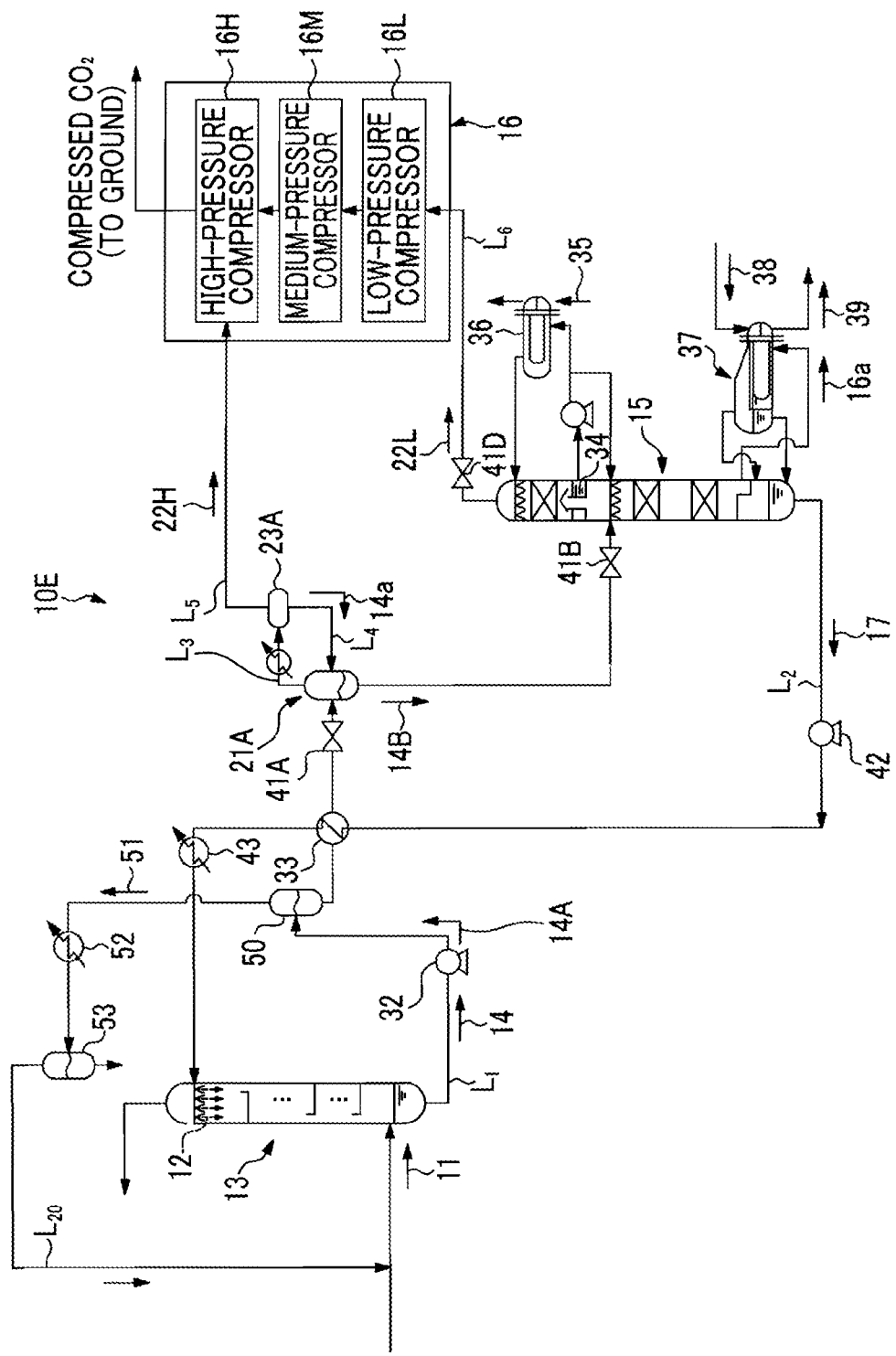
FIG. 8 is a schematic diagram illustrating a $CO_2$ recovery system according to Embodiment 4.

FIG. 8 is a schematic diagram illustrating a $CO_2$ recovery system according to Embodiment 4. As illustrated in FIG. 8, a $CO_2$ recovery system 10E according to the embodiment is the same as the $CO_2$ recovery system 10B illustrated in FIG. 3, except that a pressure-reducing valve 41D is provided in the gas feed line $L_6$ extended from the regeneration tower 15 to feed gas, emitted from the tower top portion of the regeneration tower 15, as the low-pressure $CO_2$ gas 22L.

With such a configuration, since the pressurized rich solution is introduced into the regeneration tower, the lean solution 17 emitted from the bottom portion of the regeneration tower 15 has a temperature of about 140° C. and a pressure of about 250 kPaG. However, the absorption solution may be used in this high temperature (140° C.) depending on the type thereof. Therefore, when an absorption solution having such high-temperature resistance is used, the configuration of the embodiment can be applied thereto.

The pressurized rich solution 14A is controlled to have a predetermined pressure (655 kPaG, 102° C.) by the pressure-reducing valve 41A, is introduced into the first flash drum 21A, and is partially regenerated to obtain the partially regenerated rich solution 14B by a portion of $CO_2$ being released. This partially regenerated rich solution 14B is fed to the regeneration tower 15.

The high-pressure $CO_2$ gas 22H containing 36% of the total amount of $CO_2$ which has been released in the first flash drum 21A is fed to the high-pressure compressor 16H at a gas pressure of 630 kPaG and 40° C. through the gas feed line $L_5$.

In addition, the low-pressure $CO_2$ gas 22L containing the rest of the 64% of the total amount of $CO_2$ which has been emitted from the tower top portion of the regeneration tower 15 is fed to the low-pressure compressor 16L at a gas pressure of 50 kPaG and 40° C. through the gas feed line $L_6$.

The lean solution 17 emitted from the bottom portion of the regeneration tower 15 has a temperature of about 140° C. and a pressure of 250 kPaG. Since a deterioration temperature of the amine solution constituting the absorption solution is around 150° C., deterioration in the absorption solution is small.

In the embodiment, the lean solution 17 emitted from the bottom portion of the regeneration tower 15 has a temperature of about 140° C. and a pressure of 250 kPaG and thus can be used when the absorption solution has high-temperature resistance.

Embodiment 5

A $CO_2$ recovery system according to Embodiment 5 of the present invention will be described with reference to the drawings.

Figure 9:
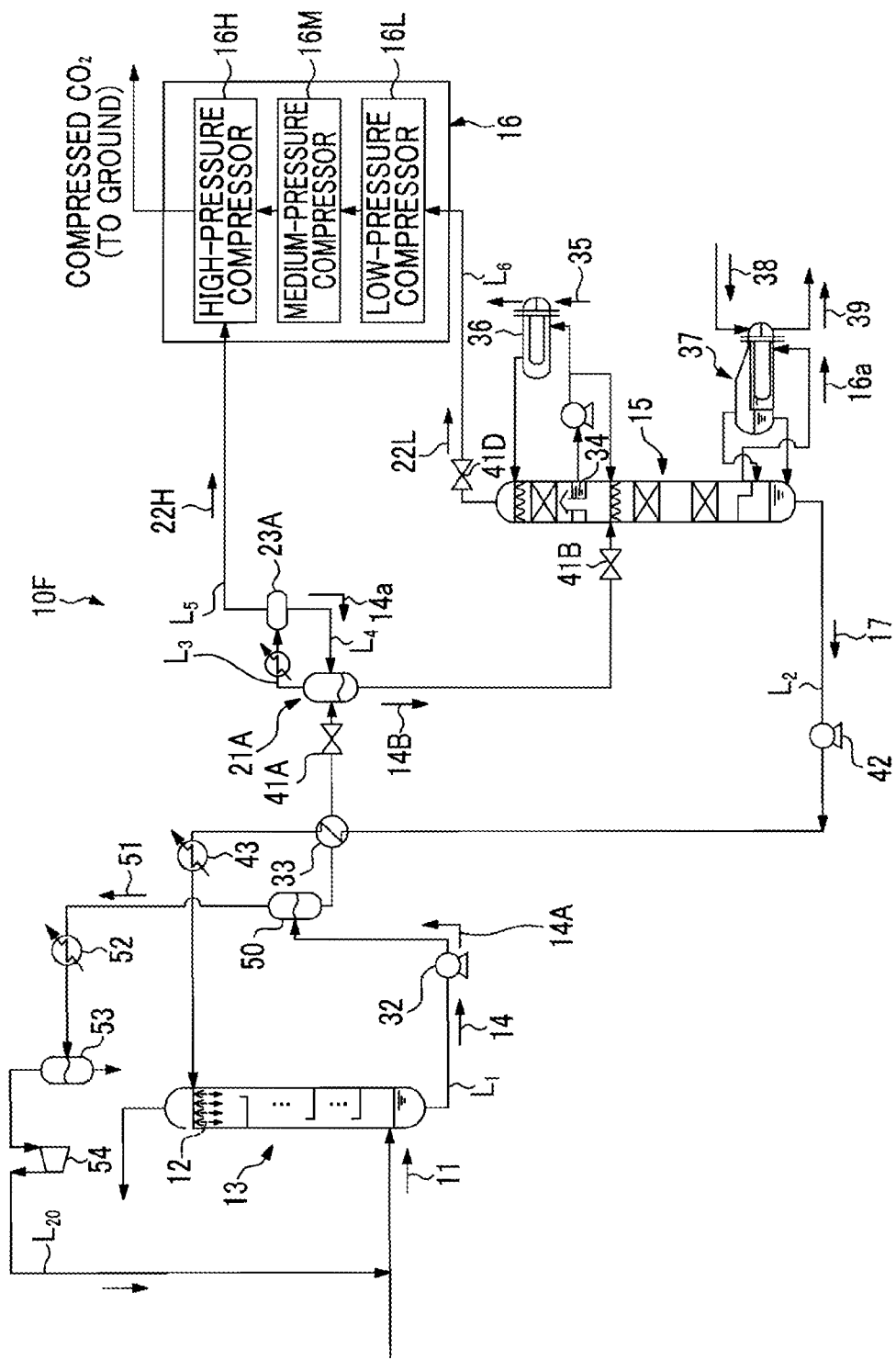
FIG. 9 is a schematic diagram illustrating a $CO_2$ recovery system according to Embodiment 5.

FIG. 9 is a schematic diagram illustrating a $CO_2$ recovery system according to Embodiment 5. As illustrated in FIG. 9, in a $CO_2$ recovery system 10F according to the embodiment, a pressurization type absorption tower 13 is provided, and pressurized gas is used as the gas to be introduced.

As the pressurized gas containing $CO_2$, for example, pressurized gas for fertilizer synthesis or high-pressure natural gas (gas pressure: for example, 3,000 kPaG) may be used.

Since the rich solution 14 emitted from the absorption tower 13 is in the pressurized state, the booster pump is unnecessary unlike Embodiment 1, and a liquid feed pump 32A is provided for feeding liquid.

In addition, it is necessary that the lean solution 17 regenerated in the regeneration tower 15 be pressurized when being fed to the absorption tower 13. Therefore, the lean solution 17 is pressurized by a booster pump 42A provided in a second liquid feed line $L_2$.

In the $CO_2$ recovery system 10F illustrated in FIG. 9, by the first flash drum 21A releasing the pressure through the flash operation, a portion of $CO_2$ absorbed in the pressurized rich solution 14A is released and emitted as the high-pressure $CO_2$ gas 22H. This emitted high-pressure $CO_2$ gas 22H is introduced into the high-pressure compressor 16H of the $CO_2$ compression device 16 that is provided on a gas flow downstream side of the regeneration tower 15 to compress $CO_2$.

In addition, the low-pressure $CO_2$ gas 22L containing the rest of $CO_2$ which has been emitted from the tower top portion of the regeneration tower 15 is fed to the low-pressure compressor 16L at a gas pressure of 50 kPaG and 40° C. through the gas feed line $L_6$.

The lean solution 17 emitted from the bottom portion of the regeneration tower 15 has a temperature of 120° C. Since this temperature is lower than or equal to a deterioration temperature of the amine solution constituting the absorption solution, the absorption solution does not deteriorate.

In this way, in the embodiment, when pressurized gas is used, since the first flash drum 21A is provided, the high-pressure $CO_2$ gas 22H can be extracted. Compression power for compressing $CO_2$ gas, which is emitted from the high-pressure regeneration tower 15, can be significantly saved, and the size of compression facilities can be reduced.

In addition, in the inert gas circulating line $L_{20}$ that circulates the inert gas 51, a compressor 54 is provided on a downstream side of the gas-liquid separator 53 so as to meet the high-pressure gas 11.

REFERENCE SIGNS LIST 10A and 10F: $CO_2$ RECOVERY SYSTEM
11: GAS
12: $CO_2$ ABSORPTION SOLUTION
13: ABSORPTION TOWER
14: RICH SOLUTION
15: REGENERATION TOWER
16: $CO_2$ COMPRESSION DEVICE
16H: HIGH-PRESSURE COMPRESSOR
16L: LOW-PRESSURE COMPRESSOR
16M: MEDIUM-PRESSURE COMPRESSOR
17: LEAN SOLUTION
21A: FIRST FLASH DRUM
21B: SECOND FLASH DRUM
22H: HIGH-PRESSURE $CO_2$ GAS
22L: LOW-PRESSURE $CO_2$ GAS
22M: MEDIUM-PRESSURE $CO_2$ GAS

The invention claimed is:

1. A $CO_2$ recovery system comprising:
an absorption tower that brings gas containing $CO_2$ into contact with a $CO_2$ absorption solution to generate a rich solution which is the $CO_2$ absorption solution absorbing $CO_2$ by removing $CO_2$ from the $CO_2$-containing gas;
a booster unit that is provided at a downstream side of the absorption tower in a flow of the rich solution and pressurizes the rich solution from the absorption tower;
a flash drum that is provided at a downstream side of the booster unit in a flow of the rich solution and partially flashes the rich solution pressurized by the booster unit to separate into $CO_2$ and a rich absorption solution,
a pressure reducing valve that is provided at a downstream side of the flash drum in a flow of the rich absorption solution and decreases a pressure of the rich absorption solution from the flash drum,
a regeneration tower that is provided at a downstream side of the pressure reducing valve in a flow of the rich absorption solution and heats the rich absorption solution of which pressure is decreased, by a reboiler using a provided steam and regenerates the rich absorption solution by emitting a $CO_2$, which pressure is lower than the pressure of the $CO_2$ separated by the flash drum, by the generated steam, and
a compression device, into which the $CO_2$ emitted from the drum and the regeneration tower is introduced, that compresses the $CO_2$ emitted from the regeneration tower, wherein
the booster unit is provided between the absorption tower and the flash drum in the flow of the rich solution, and the pressure reducing valve is provided between the flash drum and the regeneration tower in the flow of the rich absorption solution, and
the compression device includes:
a first compressor into which the $CO_2$ emitted by the regeneration tower is introduced, and configured to compress the introduced $CO_2$; and
a second compressor into which the $CO_2$ emitted from the flash drum and the $CO_2$ compressed by the first compressor are introduced, and configured to compress the introduced $CO_2$ with higher pressure than the first compressor.

2. The $CO_2$ recovery system according to claim 1, wherein
an assist pressure reducing valve and an assist flash drum are provided between the flash drum and the regeneration tower, and
the compression device includes a third compressor, wherein
the assist pressure reducing valve decreases a pressure of the rich absorption solution from the flash drum,
the assist flash drum partially flashes the rich absorption solution of which pressure is decreased by the assist pressure reducing valve to separate a $CO_2$, which pressure is lower than the pressure of the $CO_2$ from the flash drum and higher than the pressure of the $CO_2$ from the regeneration tower, and the rich absorption solution,
the pressure reducing valve decreases the pressure of the rich absorption solution from the assist flash drum,
the third compressor into which the $CO_2$ emitted by the assist flash drum and the $CO_2$ compressed by the first compressor are introduced, and is configured to compress the introduced $CO_2$ with higher pressure than the first and with lower pressure than the second compressor, and
the second compressor into which the $CO_2$ emitted from the flash drum and the $CO_2$ compressed by the third compressor are introduced, and configured to compress the introduced $CO_2$.

3. The $CO_2$ recovery system according to claim 2, wherein a heat exchanger which heats the rich solution is provided between the absorption tower and the flash drum.

4. The $CO_2$ recovery system according to claim 2, wherein an inert gas separator, which separates inert gas, and an inert gas introduction line, which introduces the separated inert gas into the absorption tower, are provided between the absorption tower and the flash drum.

5. The $CO_2$ recovery system according to claim 1, wherein when the gas introduced into the absorption tower is normal-pressure gas which is near atmospheric pressure, a normal-pressure absorption tower is used as the absorption tower,
a booster pump that pressurizes the rich solution emitted from the normal-pressure absorption tower is provided, and
the pressurized rich solution is subjected to gas-liquid separation by a gas-liquid separator.

6. The $CO_2$ recovery system according to claim 1, wherein when the gas introduced into the absorption tower is high-pressure gas which pressure is higher than an atmospheric pressure in certain value, a pressurization absorption tower is used as the absorption tower, and
the pressurized rich solution emitted from the pressurization absorption tower is subjected to gas-liquid separation by a gas-liquid separator.

7. The $CO_2$ recovery system according to claim 1, wherein the booster unit pressurizes the rich solution at higher pressure than a compression pressure of the second compressor.

* * * * *